United States Patent
Takiguchi et al.

(10) Patent No.: US 6,388,562 B1
(45) Date of Patent: May 14, 2002

(54) CONTACTLESS IC CARD COMMUNICATION SYSTEM AND RELATED METHOD

(75) Inventors: Masahiro Takiguchi, Anjo; Kiyoshi Takahashi, Hekinan; Tatsuya Hirata, Anjo; Shigeru Date, Tokyo; Hisanobu Dobashi, Tokyo; Shinji Nishimura, Tokyo; Ryouzo Yoshino, Hadano; Tomoaki Ishifuji, Tokyo; Hiromi Sato, Shiroishi; Toru Miura, Tokyo, all of (JP)

(73) Assignees: Denso Corporation, Kariya; Nippon Telegraph and Telephone Corporation, Tokyo; Hitachi Ltd., Tokyo; Tokin Corporation, Sendai, all of (JP)

( * ) Notice: Subject to any disclaimer, the term of this patent is extended or adjusted under 35 U.S.C. 154(b) by 0 days.

(21) Appl. No.: 09/228,413

(22) Filed: Jan. 12, 1999

(30) Foreign Application Priority Data

Jan. 12, 1998 (JP) ............................................ 10-004233

(51) Int. Cl.$^7$ ................................................ H04Q 5/22
(52) U.S. Cl. .................. 340/10.2; 340/10.1; 340/10.32; 340/10.33; 340/10.41; 340/5.61; 340/572.1; 235/375; 235/492; 342/44
(58) Field of Search ............................. 340/10.2, 10.1, 340/10.32, 10.33, 10.41, 5.61, 572.1, 825.52, 825.53; 235/375, 492; 342/44

(56) References Cited

U.S. PATENT DOCUMENTS

| 4,638,313 A | * | 1/1987 | Sherwood, Jr. et al. .. 340/825.52 |
| 5,541,928 A | | 7/1996 | Kobayashi et al. ........ 370/95.1 |
| 5,698,837 A | * | 12/1997 | Furuta ......................... 235/492 |
| 5,856,788 A | * | 1/1999 | Walter et al. ............... 340/10.1 |
| 5,940,006 A | * | 8/1999 | MacLellan et al. ....... 340/10.41 |

FOREIGN PATENT DOCUMENTS

| EP | 709803 | 5/1996 |
| EP | 744708 | 11/1996 |

* cited by examiner

Primary Examiner—Brian Zimmerman
Assistant Examiner—Yves Dalencourt
(74) Attorney, Agent, or Firm—Harness, Dickey & Pierce, PLC

(57) ABSTRACT

A reader/writer (RW) requires identification of anti-collision techniques used by IC cards (A, B, C, and D). The IC cards implement answers to the anti-collision technique identification requirement by the reader/writer at different timings respectively for respective IC cards among the IC cards which use different anti-collision techniques respectively. The reader/writer requires identifications of types of the IC cards in dependence upon the anti-collision techniques in response to the answers by the IC cards. The IC cards return identification data thereof in response to the card type identification requirements by the reader/writer for respective IC cards among the IC cards which use different anti-collision techniques respectively. The reader/writer identifies the types of the IC cards in response to the identification data of the respective IC cards.

6 Claims, 6 Drawing Sheets

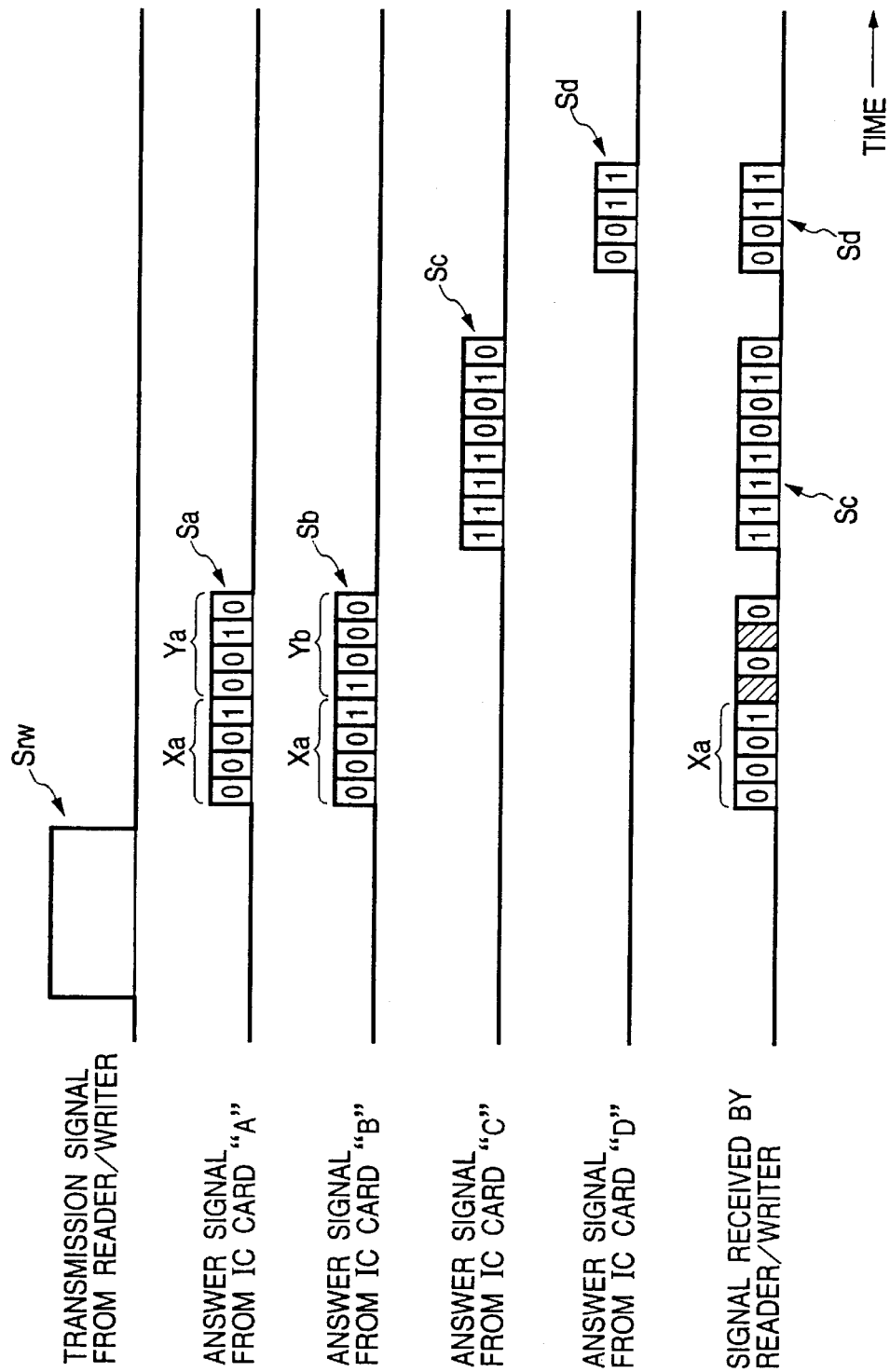

CONTACTLESS IC CARD COMMUNICATION SYSTEM AND RELATED METHOD

BACKGROUND OF THE INVENTION

1. Field of the Invention

This invention relates to a contactless IC (integrated circuit) card communication system. This invention also relates to a method of contactless communications between a reader/writer and IC cards.

2. Description of the Related Art

In a prior-art contact IC card communication system, IC cards communicate with readers/writers when being inserted thereinto. In each of the readers/writers, the type of an IC card placed thereinto is detected as follows. When the IC card is reset, for example, when the IC card is subjected to a power-on resetting process, the IC card transmits a reset notice to a reader/writer. The reset notice contains information of the type of the IC card. The reader/writer detects the type of the IC card in response to the reset notice transmitted from the IC card.

In an example of proposed contactless IC card communication systems, readers/writers are provided on telephone sets (or automatic vending machines) respectively, and prepaid cards for using them are composed of IC cards which can communicate with the readers/writers by radio. In such a contactless IC card communication system, there is a chance that reset notices transmitted from different IC cards toward a common reader/writer collide with each other. A typical communication anti-collision technique is designed as follows. Every IC card is inhibited from transmitting a reset notice without receiving permission. Different IC cards are permitted to transmit reset notices at different timings.

Communication anti-collision techniques are of plural types. It is difficult to avoid a communication collision between IC cards designed according to different anti-collision techniques respectively.

SUMMARY OF THE INVENTION

It is a first object of this invention to provide a contactless IC card communication system which can avoid a communication collision between IC cards designed according to different anti-collision techniques respectively.

It is a second object of this invention to provide a method of contactless IC card communications which can avoid a communication collision between IC cards designed according to different anti-collision techniques respectively.

A first aspect of this invention provides a contactless IC card communication system comprising a reader/writer (RW) and IC cards which communicate with each other on a contactless basis according to anti-collision techniques; first means (200, 20, 30, 40) provided in the reader/writer for implementing identification requirement with respect to given anti-collision techniques among the anti-collision techniques; second means (320, 90, 60, 110) provided in respective IC cards among the IC cards which use different anti-collision techniques respectively for implementing answers to the anti-collision technique identification requirement by the first means at different timings respectively; third means (250, 20, 30, 40) provided in the reader/writer for requiring identifications of types of the IC cards in dependence upon the given anti-collision techniques in response to the answers by the second means; fourth means (350, 60, 90, 110) provided in respective IC cards among the IC cards which use different anti-collision techniques respectively for returning identification data of the related IC cards in response to the card type identification requirements by the third means; and fifth means (250, 20, 30, 40) provided in the reader/writer for identifying the types of the IC cards in response to the identification data returned by the fourth means.

A second aspect of this invention provides a contactless IC card communication method in which a reader/writer (RW) and IC cards communicate with each other on a contactless basis according to anti-collision techniques. The method comprises the steps of causing the reader/writer to implement identification requirement with respect to given anti-collision techniques among the anti-collision techniques by the reader/writer; implementing answers to the anti-collision technique identification requirement by the reader/writer at different timings respectively for respective IC cards among the IC cards which use different anti-collision techniques respectively; causing the reader/writer to require identifications of types of the IC cards in dependence upon the given anti-collision techniques in response to the answers for the respective IC cards; returning identification data of the IC cards in response to the card type identification requirements by the reader/writer for respective IC cards among the IC cards which use different anti-collision techniques respectively; and causing the reader/writer to identify the types of the IC cards in response to the identification data of the respective IC cards.

A third aspect of this invention provides a contactless IC card communication system comprising a reader/writer; a first IC card using a first anti-collision technique; a second IC card using a second anti-collision technique different from the first anti-collision technique; first means provided in the reader/writer for transmitting a first requirement signal to the first IC card and the second IC card; second means provided in the first IC card for generating a first answer signal in response to the first requirement signal transmitted from the reader/writer, and for returning the first answer signal to the reader/writer at a first timing, the first answer signal representing the anti-collision technique used by the first IC card; third means provided in the second IC card for generating a second answer signal in response to the first requirement signal transmitted from the reader/writer, and for returning the second answer signal to the reader/writer at a second timing different from the first timing, the second answer signal representing the anti-collision technique used by the second IC card; fourth means provided in the reader/writer for generating a second requirement signal in response to the first answer signal transmitted from the first IC card, and for transmitting the second requirement signal to the first IC card at a third timing determined by the anti-collision technique represented by the first answer signal; and fifth means provided in the reader/writer for generating a third requirement signal in response to the second answer signal transmitted from the second IC card, and for transmitting the third requirement signal to the second IC card at a fourth timing different from the third timing and determined by the anti-collision technique represented by the second answer signal.

A fourth aspect of this invention is based on the third aspect thereof, and provides a contactless IC card communication system further comprising sixth means provided in the first IC card for generating a third answer signal and returning the third answer signal to the reader/writer in response to the second requirement signal transmitted from the reader/writer, the third answer signal representing identification information of the first IC card; seventh means provided in the second IC card for generating a fourth answer signal and returning the fourth answer signal to the reader/writer in response to the third requirement signal transmitted from the reader/writer, the fourth answer signal representing identification information of the second IC card; eighth means provided in the reader/writer for recovering the identification information of the first IC card from the third answer signal transmitted therefrom, and for storing the recovered identification information of the first IC card; and ninth means provided in the reader/writer for recovering the identification information of the second IC card from the fourth answer signal transmitted therefrom, and for storing the recovered identification information of the second IC card.

BRIEF DESCRIPTION OF THE DRAWINGS

FIG. 7 is a time-domain diagram of signals generated in the reader/writer and the IC cards of FIG. 1.

DESCRIPTION OF THE PREFERRED EMBODIMENT

Figure 1:
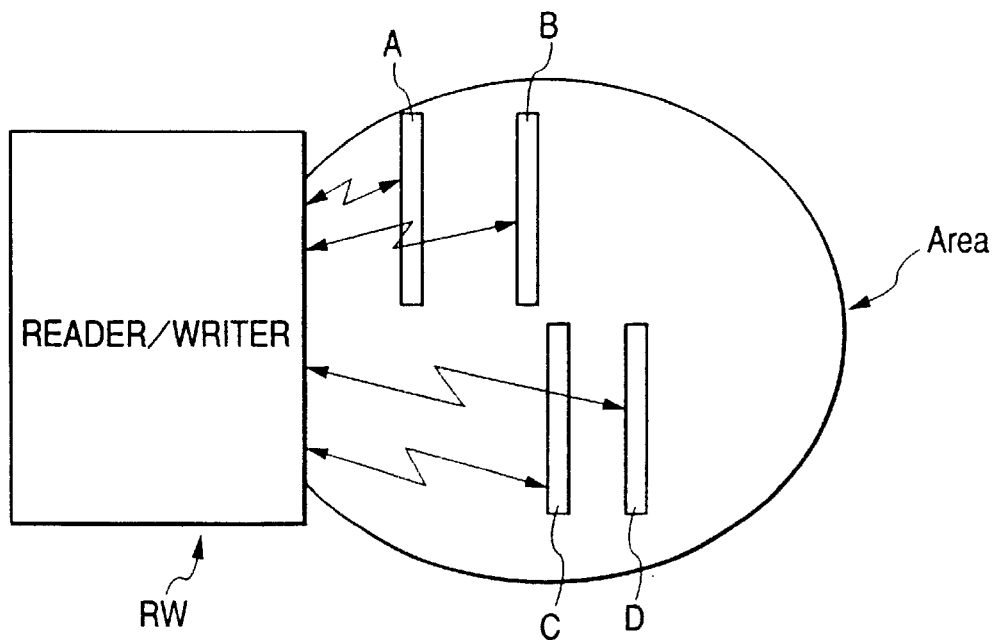
FIG. 1 is a diagram of a contactless IC card communication system according to an embodiment of this invention.

With reference to FIG. 1, a contactless IC card communication system includes a reader/writer RW provided on, for example, a telephone set. A given communication service area (a given communication coverage) provided by the reader/writer RW extends therefrom. Under exemplary conditions shown in FIG. 1, four IC cards "A", "B", "C", and "D" are placed in the communication service area. For example, the IC cards "A", "B", "C", and "D" are prepaid cards for using a telephone set. The reader/writer RW can communicate with the IC cards "A", "B", "C", and "D" by radio.

Figure 2:
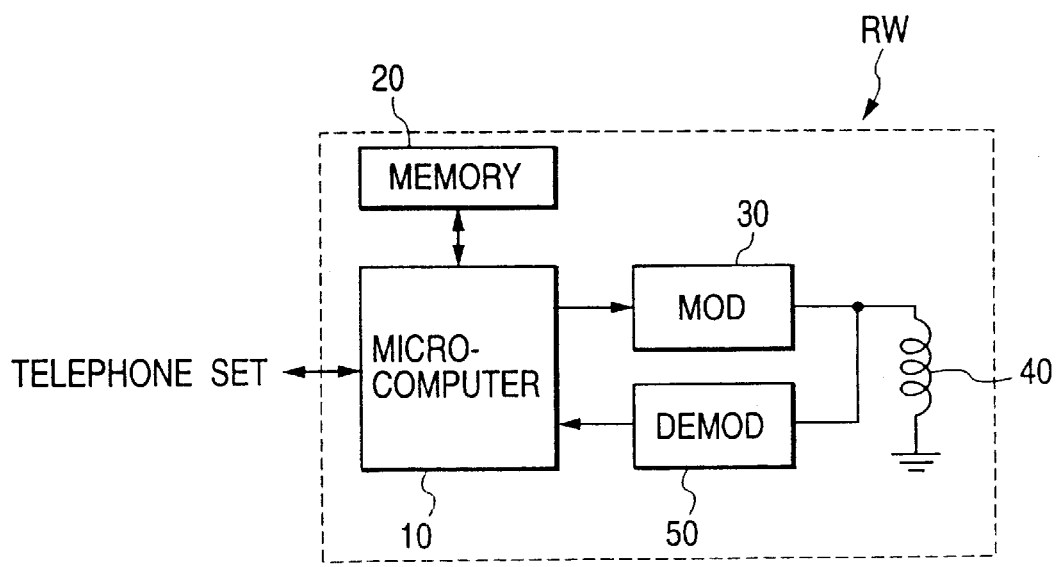
FIG. 2 is a block diagram of an electrical portion of a reader/writer in FIG. 1.

As shown in FIG. 2, the reader/writer RW includes a microcomputer 10, a memory 20, a modulation circuit 30, an antenna 40, and a demodulation circuit 50. The modulation circuit 30 and the demodulation circuit 50 are connected to the antenna 40. The microcomputer 10 is connected to the memory 20, the modulation circuit 30, and the demodulation circuit 50. The microcomputer 10 is electrically connected to, for example, a telephone set.

The microcomputer 10 includes a combination of an input/output port, a CPU, a ROM, and a RAM. The microcomputer 10 operates in accordance with a program stored in the ROM. The program has a first segment for implementing radio communication with each IC card placed in the communication service area. The program has a second segment for detecting or identifying the type of each IC card in response to information of an anti-collision technique used by the IC card.

The memory 20 is previously loaded with data representing anti-collision techniques usable by IC cards, card type identification requirement signals (card type identification requirement code words), and data representing predetermined assignment of the card type identification requirement signals to the anti-collision techniques (data representing a predetermined relation between the card type identification requirement signals and the anti-collision techniques). The memory 20 can be accessed by the microcomputer 10.

The modulation circuit 30 receives output data (a baseband signal) from the microcomputer 10. The modulation circuit 30 subjects the output data from the microcomputer 10 to modulation, thereby converting the data (the baseband signal) into a radio signal. The modulation circuit 30 outputs the radio signal to the antenna 40. The radio signal is radiated by the antenna 40.

A radio signal coming from each IC card in the communication service area is received by the antenna 40. The received radio signal is fed from the antenna 40 to the demodulation circuit 50. The demodulation circuit 50 subjects the received radio signal to demodulation, thereby recovering baseband data therefrom. The demodulation circuit 50 outputs the recovered data to the microcomputer 10.

Figure 3:
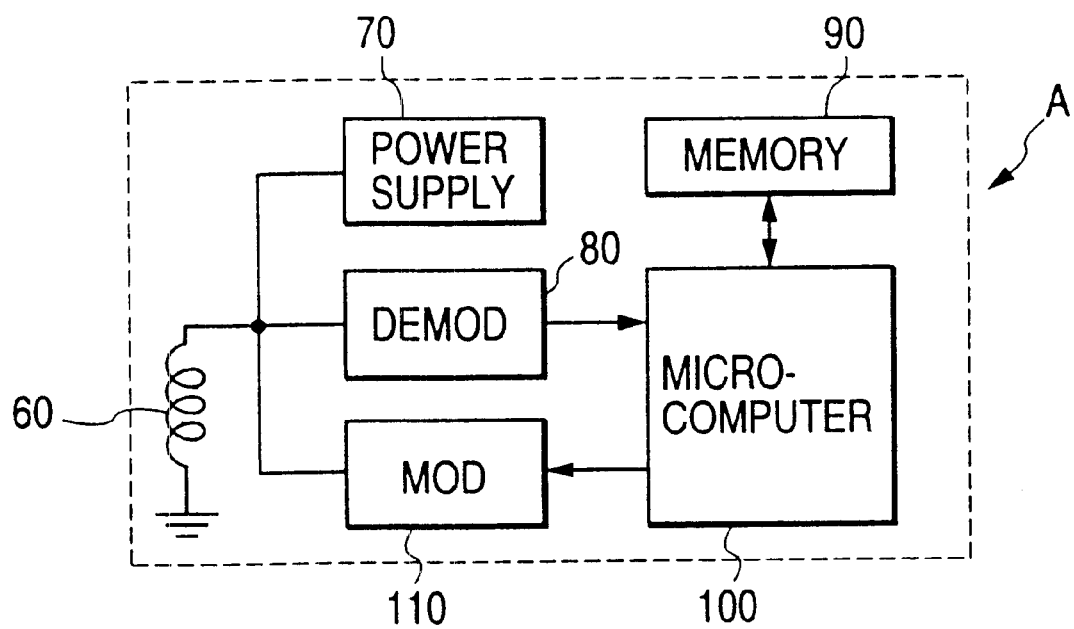
FIG. 3 is a block diagram of an electrical portion of an IC card in FIG. 1.

The IC cards "A", "B", "C", and "D" are similar in structure. Accordingly, only the structure of the IC card "A" will be explained in detail. As shown in FIG. 3, the IC card "A" includes an antenna 60, a power supply circuit 70, a demodulation circuit 80, a memory 90, a microcomputer 100, and a modulation circuit 10. The antenna 60 is connected to the power supply circuit 70, the demodulation circuit 80, and the modulation circuit 110. The microcomputer 100 is connected to the demodulation circuit 80, the memory 90, and the modulation circuit 110.

A radio signal coming from the reader/writer RW is received by the antenna 60. The received radio signal is fed from the antenna 60 to the power supply circuit 70 and the demodulation circuit 80. The power supply circuit 70 generates DC power from the received radio signal, and stores the generated DC power. In addition, the power supply circuit 70 feeds the DC power to the demodulation circuit 80, the memory 90, the microcomputer 100, and the modulation circuit 110 to activate them.

The demodulation circuit 80 subjects the received radio signal to demodulation, thereby recovering baseband data therefrom. The demodulation circuit 80 outputs the recovered data to the microcomputer 100.

The memory 90 is previously loaded with data representing an anti-collision technique used by the related IC card (the IC card "A"), data representing an identification code word corresponding to a type of the related IC card (the IC card "A"), and data representing parameters of the related IC card (the IC card "A"). The memory 90 can be accessed by the microcomputer 100. The anti-collision technique used by the IC card "A" is of, for example, the slotted ALOHA type.

The microcomputer 100 includes a combination of an input/output port, a CPU, a ROM, and a RAM. The microcomputer 100 operates in accordance with a program stored in the ROM. The program has a first segment for implementing radio communications with the reader/writer RW. The program has a second segment designed to process requirements for the transmission of the information of the anti-collision technique used by the related IC card (the IC card "A") and the identification The modulation circuit 110 receives output data (a baseband signal) from the microcomputer 100. The modulation circuit 110 subjects the output data from the microcomputer 100 to modulation, thereby converting the data (the baseband signal) into a radio signal. The modulation circuit 110 outputs the radio signal to the antenna 60. The radio signal is radiated by the antenna 60.

It is assumed that an anti-collision technique used by the IC card "B" is the same as that used by the IC card "A", and that anti-collision techniques used by the respective IC cards "C" and "D" are different from each other and are also different from that used by the IC cards "A" and "B". The anti-collision technique used by the IC cards "A" and "B" is referred to as the first anti-collision technique. The anti-collision technique used by the IC card "C" is referred to as the second anti-collision technique. The anti-collision technique used by the IC card "D" is referred to as the third anti-collision technique.

Accordingly, the anti-collision technique data in the memory 90 of the IC card "B" is the same as that in the memory 90 of the IC card "A". The anti-collision technique data in the memory 90 of the IC card "C" and the anti-collision technique data in the memory 90 of the IC card "D" are different from each other, and are also different from that in the memory 90 of the IC card "A" or the IC card "B".

In addition, the program in the microcomputer 100 of the IC card "B" is similar to that in the microcomputer 100 of the IC card "A". The program in the microcomputer 100 of the IC card "C" or "D" is basically similar to that in the microcomputer 100 of the IC card "A" except a portion related to the used anti-collision technique.

The contactless IC card communication system operates as follows. It is assumed that as shown in FIG. 1, the IC cards "A", "B", "C", and "D" exist in the communication service area provided by the reader/writer RW.

In the reader/writer RW, the microcomputer 10 outputs a signal Srw (see FIG. 6) of a requirement for the identification of IC-card anti-collision techniques to the modulation circuit 30. The modulation circuit 30 converts the anti-collision technique identification requirement signal Srw into a corresponding command radio signal referred to as a first command radio signal. The modulation circuit 30 outputs the first command radio signal to the antenna 40.

The first command radio signal is radiated by the antenna 40, being transmitted from the reader/writer RW to the IC cards "A", "B", "C", and "D".

In each of the IC cards "A", "B", "C", and "D", the first command radio signal is received by the antenna 60. The received first command radio signal is fed from the antenna 60 to the demodulation circuit 80. The demodulation circuit 80 recovers the anti-collision technique identification requirement signal Srw from the received first command radio signal. The demodulation circuit 80 outputs the recovered anti-collision technique identification requirement signal Srw to the microcomputer 100.

In each of the IC cards "A", "B", "C", and "D", the microcomputer 100 reads out the data from the memory 90 in response to the anti-collision technique identification requirement signal Srw, and generates an answer signal Sa, Sb, Sc, or Sd (see FIG. 6) from the readout data. The microcomputer 100 outputs the answer signal Sa, Sb, Sc, or Sd (see FIG. 6) to the modulation circuit 110. The answer signal Sa, Sb, Sc, or Sd contains the information of the anti-collision technique used by the related IC card.

Specifically, the answer signal Sa outputted from the microcomputer 100 in the IC card "A" includes 8-bit serial-form data divided into 4-bit serial-form data Xa representing the anti-collision technique used by the IC card "A" (the first anti-collision technique), and 4-bit serial-form data Ya representing parameters of the IC card "A" (see FIG. 7).

The answer signal Sb outputted from the microcomputer 100 in the IC card "B" includes 8-bit serial-form data divided into 4-bit serial-form data Xa representing the anti-collision technique used by the IC card "B" (the first anti-collision technique), and 4-bit serial-form data Yb representing parameters of the IC card "B" (see FIG. 7).

The former 4-bit portions of the 8-bit answer signals Sa and Sb are the same as shown in FIG. 7 since the first anti-collision technique is used in common by the IC cards "A" and "B".

The answer signal Sc outputted from the microcomputer 100 in the IC card "C" includes 8-bit serial-form data representing the anti-collision technique used by the IC card "C" (see FIG. 7), that is, representing the second anti-collision technique.

The answer signal Sd outputted from the microcomputer 100 in the IC card "D" includes 4-bit serial-form data representing the anti-collision technique used by the IC card "D" (see FIG. 7), that is, the third anti-collision technique.

Figure 6:
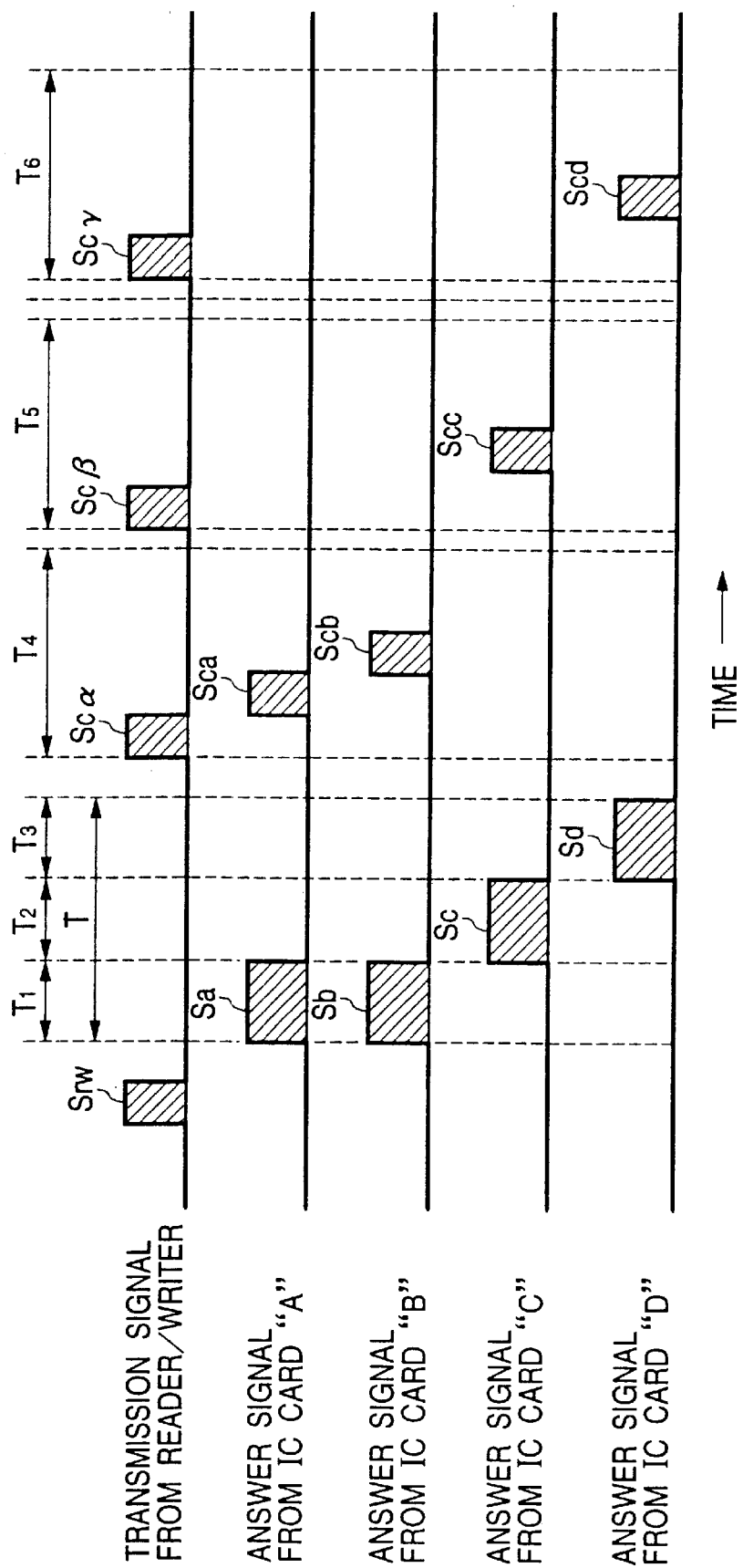
FIG. 6 is a time-domain diagram of signals generated in the reader/writer and IC cards of FIG. 1.

As shown in FIG. 6, the time of the outputting of each of the answer signals Sa and Sb from the related microcomputer 100 is in a given time interval T1. The time interval T1 starts from the moment at which the recovered anti-collision technique identification requirement signal Srw is inputted into the microcomputer 100 from the demodulation circuit 80. The time of the outputting of the answer signal Sc from the related microcomputer 100 is in a given time interval T2 immediately following the time interval T1. The time of the outputting of the answer signal Sd from the related microcomputer 100 is in a given time interval T3 immediately following the time interval T2. This timing difference is provided by the differences among the first, second, and third anti-collision techniques.

In the IC card "A", the modulation circuit 110 converts the anti-collision technique answer signal Sa into a corresponding radio answer signal Ra. The modulation circuit 10 feeds the radio answer signal Ra to the antenna 60. The antenna 60 radiates and transmits the radio answer signal Ra.

In the IC card "B", the modulation circuit 110 converts the anti-collision technique answer signal Sb into a corresponding radio answer signal Rb. The modulation circuit 110 feeds the radio answer signal Rb to the antenna 60. The antenna 60 radiates and transmits the radio answer signal Rb.

In the IC card "C", the modulation circuit 110 converts the anti-collision technique answer signal Sc into a corresponding radio answer signal Rc. The modulation circuit 110 feeds the radio answer signal Rc to the antenna 60. The antenna 60 radiates and transmits the radio answer signal Rc.

In the IC card "D", the modulation circuit 110 converts the anti-collision technique answer signal Sd into a corresponding radio answer signal Rd. The modulation circuit 110 feeds the radio answer signal Rd to the antenna 60. The antenna 60 radiates and transmits the radio answer signal Rd.

The antenna 40 in the reader/writer RW receives the radio answer signals Ra and Rb from the antennas 60 of the IC cards "A" and "B" at substantially the same timing. Then, the antenna 40 receives the radio answer signal Rc from the antenna 60 of the IC card "C". Subsequently, the antenna 40 receives the radio answer signal Rd from the antenna 60 of the IC card "D".

In the reader/writer RW, the received radio answer signals Ra and Rb are fed from the antenna 40 to the demodulation circuit 50. Then, the received radio answer signal Rc is fed from the antenna 40 the demodulation circuit 50. Subsequently, the received radio answer signal Rd is fed from the antenna 40 to the demodulation circuit 50.

First, the demodulation circuit 50 accurately recovers at least former halves of the anti-collision technique answer signals Sa and Sb from the received radio answer signals Ra and Rb even if latter halves thereof fail to be accurately detected. The demodulation circuit 50 outputs the recovered anti-collision technique answer signals Sa and Sb to the microcomputer 10. Then, the demodulation circuit 50 recovers the anti-collision technique answer signal Sc from the received radio answer signal Rc. The demodulation circuit 50 outputs the recovered anti-collision technique answer signal Sc to the microcomputer 10. Subsequently, the demodulation circuit 50 recovers the anti-collision technique answer signal Sd from the received radio answer signal Rd. The demodulation circuit 50 outputs the recovered anti-collision technique answer signal Sd to the microcomputer 10.

In response to the anti-collision technique answer signals Sa and Sb, the microcomputer 10 decides that at least one answer to the anti-collision technique identification requirement has come from an IC card using the first anti-collision technique, and that at least one IC card using the first anti-collision technique is present in the communication service area. In response to the anti-collision technique answer signal Sc, the microcomputer 10 decides that at least one answer to the anti-collision technique identification requirement has come from an IC card using the second anti-collision technique, and that at least one IC card using the second anti-collision technique is present in the communication service area. In response to the anti-collision technique answer signal Sd, the microcomputer 10 decides that at least one answer to the anti-collision technique identification requirement has come from an IC card using the third anti-collision technique, and that at least one IC card using the third anti-collision technique is present in the communication service area.

Subsequently, the microcomputer 10 implements steps of identifying the types of the IC cards "A", "B", "C", and "D" in dependence upon the anti-collision techniques. Specifically, in response to the first anti-collision technique represented by the answer signal Sa or Sb, the microcomputer 10 accesses the data in the memory 20 which represents the relation of the first anti-collision technique with a requirement signal. In response to the accessed data, the microcomputer 10 generates a signal Scα of a requirement for the identification of the type of the IC card (the types of the IC cards) using the first anti-collision technique. The microcomputer 10 outputs the card type identification requirement signal Scα to the modulation circuit 30 (see FIG. 6). The card type identification requirement signal Scα has a card type identification requirement code word corresponding to the first anti-collision technique (the anti-collision technique used by the IC cards "A" and "B"). As shown in FIG. 6, the time of the outputting of the card type identification requirement signal Scα from the microcomputer 10 is in a given time interval T4. The time interval T4 starts from the moment at which the microcomputer 10 decides that an answer to the anti-collision technique identification requirement has come from the IC card using the first anti-collision technique (the IC card "A" or "B"). The microcomputer 10 determines the time at which the card type identification requirement signal Scα should be outputted in accordance with the first anti-collision technique.

The modulation circuit 30 converts the card type identification requirement signal Scα into a corresponding command radio signal referred to as a second command radio signal. The modulation circuit 30 outputs the second command radio signal to the antenna 40. The second command radio signal is radiated by the antenna 40, being transmitted from the reader/writer RW.

In the IC card "A", the second command radio signal is received by the antenna 60. The received second command radio signal is fed from the antenna 60 to the demodulation circuit 80. The demodulation circuit 80 recovers the card type identification requirement signal Scα from the received second command radio signal. The demodulation circuit 80 outputs the recovered card type identification requirement signal Scα to the microcomputer 100.

In the IC card "A", the microcomputer 100 reads out the data from the memory 90 in response to the card type identification requirement signal Scα, and generates an answer signal Sca (see FIG. 6) from the readout data. The microcomputer 100 outputs the generated answer signal Sca to the modulation circuit 110. The answer signal Sca contains the identification information of the type of the IC card "A" which is related to the anti-collision technique (the first anti-collision technique) used by the IC card "A". The time of the outputting of the card type identification answer signal Sca is in the time interval T4 (see FIG. 6).

In the IC card "A", the modulation circuit 110 converts the card type identification answer signal Sca into a corresponding radio answer signal Raa. The modulation circuit 110 feeds the radio answer signal Raa to the antenna 60. The antenna 60 radiates and transmits the radio answer signal Raa.

The antenna 40 in the reader/writer RW receives the radio answer signal Raa from the antenna 60 of the IC card "A". In the reader/writer RW, the received radio answer signal Raa is fed from the antenna 40 to the demodulation circuit 50. The demodulation circuit 50 recovers the card type identification answer signal Sca from the received radio answer signal Raa. The demodulation circuit 50 outputs the recovered card type identification answer signal Sca to the microcomputer 10. The microcomputer 10 generates a card type identification code word, which corresponds to the IC card "A", in response to the card type identification answer signal Sca. The microcomputer 10 writes data of the generated card type identification code word in the memory 20. Thus, the identification of the type of the IC card "A" by the reader/writer RW is completed. The data of the generated card type identification word in the memory 20 will be used later in IC card control.

The IC card "B" receives the second command radio signal from the reader/writer RW, and recovers the card type identification requirement signal Scα from the received second command radio signal as the IC card "A" does. In the IC card "B", the microcomputer 100 reads out the data from the memory 90 in response to the card type identification requirement signal Scα, and generates an answer signal Scb (see FIG. 6) from the readout data. The microcomputer 100 outputs the answer signal Scb to the modulation circuit 110. The answer signal Scb contains the information of the type of the IC card "B" which is related to the anti-collision technique (the first anti-collision technique) used by the IC card "B". The time of the outputting of the card type identification answer signal Scb is in the time interval T4 (see FIG. 6). For example, the time of the outputting of the card type identification answer signal Scb follows the time of the outputting of the card type identification signal Sca. This timing difference is provided by the anti-collision technique used by the IC cards "A" and "B". In the IC card "B", the modulation circuit 110 converts the card type identification answer signal Scb into a corresponding radio answer signal Rab. The IC card "B" transmits the radio answer signal Rab to the reader/writer RW. The reader/writer RW identifies the type of the IC card "B" in response to the radio answer signal Rab similarly to the identification of the type of the IC card "A"

After the identification of the types of the IC cards "A" and "B" has been completed, the reader/writer RW sequentially implements the identification of the type of the IC card "C" and the identification of the type of the IC card "D".

Specifically, in response to the second anti-collision technique represented by the answer signal Sc, the microcomputer 10 in the reader/writer RW accesses the data in the memory 20 which represents the relation of the second anti-collision technique with a requirement signal. In response to the accessed data, the microcomputer 10 generates a signal Scβ of a requirement for the identification of the type of the IC card using the second anti-collision technique. The microcomputer 10 outputs the card type identification requirement signal Scβ to the modulation circuit 30 (see FIG. 6). The card type identification requirement signal Scβ has a card type identification code word corresponding to the IC card using the second anti-collision technique (the anti-collision technique used by the IC card "C"). As shown in FIG. 6, the time of the outputting of the card type identification requirement signal Scβ from the microcomputer 10 is in an initial part of a given time interval T5 following the time interval T4. The microcomputer 10 determines the time at which the card type identification requirement signal Scβ should be outputted in accordance with the second anti-collision technique.

In the reader/writer RW, the modulation circuit 30 converts the card type identification requirement signal Scβ into a corresponding command radio signal referred to as a third command radio signal. The modulation circuit 30 outputs the third command radio signal to the antenna 40. The third command radio signal is radiated by the antenna 40, being transmitted from the reader/writer RW.

In the IC card "C", the third command radio signal is received by the antenna 60. The received third command radio signal is fed from the antenna 60 to the demodulation circuit 80. The demodulation circuit 80 recovers the card type identification requirement signal Scβ from the received third command radio signal. The demodulation circuit 80 outputs the recovered card type identification requirement signal Scβ to the microcomputer 100.

In the IC card "C", the microcomputer 100 reads out the data from the memory 90 in response to the card type identification requirement signal Scβ, and generates an answer signal Scc (see FIG. 6) from the readout data. The microcomputer 100 outputs the generated answer signal Scc to the modulation circuit 110. The answer signal Scc contains the identification information of the type of the IC card "C" which is related to the anti-collision technique (the second anti-collision technique) used by the IC card "C". The time of the outputting of the card type identification answer signal Scc is in the time interval T5 (see FIG. 6).

In the IC card "C", the modulation circuit 110 converts the card type identification answer signal Scc into a corresponding radio answer signal Rac. The modulation circuit 110 feeds the radio answer signal Rac to the antenna 60. The antenna 60 radiates and transmits the radio answer signal Rac.

The antenna 40 in the reader/writer RW receives the radio answer signal Rac from the antenna 60 of the IC card "C". In the reader/writer RW, the received radio answer signal Rac is fed from the antenna 40 to the demodulation circuit 50. The demodulation circuit 50 recovers the card type identification answer signal Scc from the received radio answer signal Rac. The demodulation circuit 50 outputs the recovered card type identification answer signal Scc to the microcomputer 10. The microcomputer 10 generates a card type identification code word, which corresponds to the IC card "C", in response to the card type identification answer signal Scc. The microcomputer 10 writes data of the generated card type identification code word in the memory 20. Thus, the identification of the type of the IC card "C" by the reader/writer RW is completed. The data of the generated card type identification word in the memory 20 will be used later in IC card control.

After the identification of the type of the IC card "C" has been completed, the reader/writer RW implements the identification of the type of the IC card "D" as follows.

Specifically, in response to the third anti-collision technique represented by the answer signal Sd, the microcomputer 10 in the reader/writer RW accesses the data in the memory 20 which represents the relation of the third anti-collision technique with a requirement signal. In response to the accessed data, the microcomputer 10 generates a signal Scγ of a requirement for the identification of the type of the IC card using the third anti-collision technique. The microcomputer 10 outputs the card type identification requirement signal Scγ to the modulation circuit 30 (see FIG. 6). The card type identification requirement signal Scγ has a card type identification code word corresponding to the IC card using the third anti-collision technique (the anti-collision technique used by the IC card "D"). As shown in FIG. 6, the time of the outputting of the card type identification requirement signal Scγ from the microcomputer 10 is in an initial part of a given time interval T6 following the time interval T5. The microcomputer 10 determines the time at which the card type identification requirement signal Scγ should be outputted in accordance with the third anti-collision technique.

As understood from the previous explanation, the microcomputer 10 outputs the card type identification requirement signals Scα, Scβ, and Scγ at respective different timings according to the differences among the first, second, and third anti-collision techniques.

In the reader/writer RW, the modulation circuit 30 converts the card type identification requirement signal Scγ into a corresponding command radio signal referred to as a fourth command radio signal. The modulation circuit 30 outputs the fourth command radio signal to the antenna 40. The fourth command radio signal is radiated by the antenna 40, being transmitted from the reader/writer RW.

In the IC card "D", the fourth command radio signal is received by the antenna 60. The received fourth command radio signal is fed from the antenna 60 to the demodulation circuit 80. The demodulation circuit 80 recovers the card type identification requirement signal Scγ from the received fourth command radio signal. The demodulation circuit 80 outputs the recovered card type identification requirement signal Scγ to the microcomputer 100.

In the IC card "D", the microcomputer 100 reads out the data from the memory 90 in response to the card type identification requirement signal Scγ, and generates an answer signal Scd (see FIG. 6) from the readout data. The microcomputer 100 outputs the generated answer signal Scd to the modulation circuit 110. The answer signal Scd contains the identification information of the type of the IC card "D" which is related to the anti-collision technique (the third anti-collision technique) used by the IC card "D". The time of the outputting of the card type identification answer signal Scd is in the time interval T6 (see FIG. 6).

In the IC card "D", the modulation circuit 110 converts the card type identification answer signal Scd into a corresponding radio answer signal Rad. The modulation circuit 110 feeds the radio answer signal Rad to the antenna 60. The antenna 60 radiates and transmits the radio answer signal Rad.

The antenna 40 in the reader/writer RW receives the radio answer signal Rad from the antenna 60 of the IC card "D". In the reader/writer RW, the received radio answer signal Rad is fed from the antenna 40 to the demodulation circuit 50. The demodulation circuit 50 recovers the card type identification answer signal Scd from the received radio answer signal Rad. The demodulation circuit 50 outputs the recovered card type identification answer signal Scd to the microcomputer 10. The microcomputer 10 generates a card type identification code word, which corresponds to the IC card "D", in response to the card type identification answer signal Scd. The microcomputer 10 writes data of the generated card type identification code word in the memory 20. Thus, the identification of the type of the IC card "D" by the reader/writer RW is completed. The data of the generated card type identification word in the memory 20 will be used later in IC card control.

Figure 4:
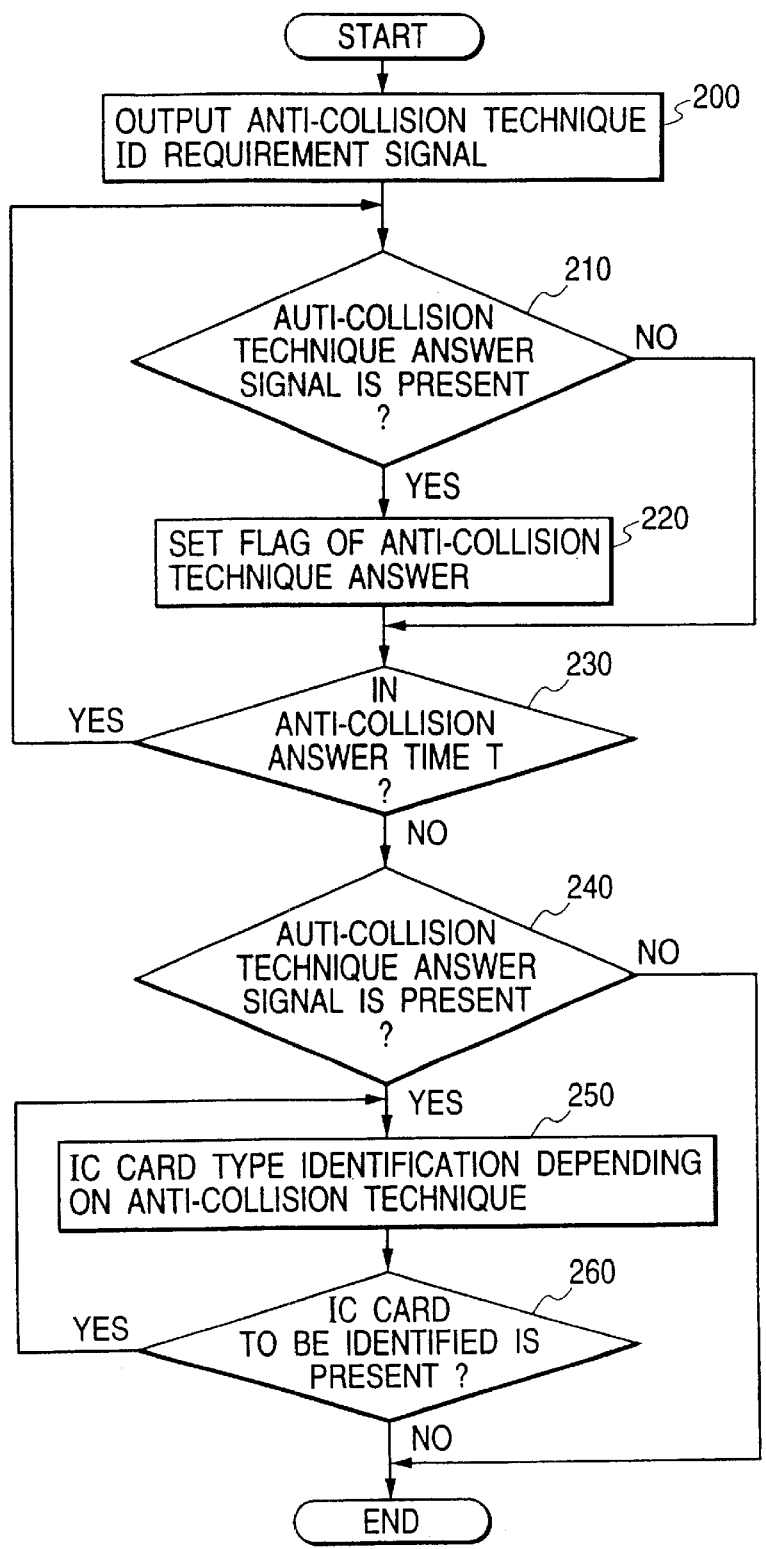
FIG. 4 is a flowchart of a program for a microcomputer in the reader/writer of FIG. 2.

As previously indicated, the microcomputer 10 in the reader/writer RW operates in accordance with a program stored in its internal ROM. FIG. 4 is a flowchart of the program in the microcomputer 10.

As shown in FIG. 4, a first step 200 of the program outputs an anti-collision technique identification requirement signal Srw to the modulation circuit 30. After the step 200, the program advances to a step 210.

The step 210 decides whether or not an anti-collision technique answer signal in the first anti-collision technique is present. This decision relates to the anti-collision technique answer signals Sa and Sb transmitted from the IC cards "A" and "B". When an anti-collision technique answer signal in the first anti-collision technique is present, the program advances from the step 210 to a step 220. Otherwise, the program jumps from the step 210 to a step 230.

In addition, the step 210 decides whether or not an anti-collision technique answer signal in the second anti-collision technique is present. This decision relates to the anti-collision technique answer signal Sc transmitted from the IC card "C". When an anti-collision technique answer signal in the second anti-collision technique is present, the program advances from the step 210 to the step 220. Otherwise, the program jumps from the step 210 to the step 230.

Furthermore, the step 210 decides whether or not an anti-collision technique answer signal in the second anti-collision technique is present. This decision relates to the anti-collision technique answer signal Sd transmitted from the IC card "D". When an anti-collision technique answer signal in the third anti-collision technique is present, the program advances from the step 210 to the step 220. Otherwise, the program jumps from the step 210 to the step 230.

The step 220 sets a flag related to the anti-collision technique answer signal decided by the step 210. The set flag represents the presence of the anti-collision technique answer signal decided by the step 210. In other words, the set flag represents that an IC card using the anti-collision technique represented by the answer signal is present in the communication service area. After the step 220, the program advances to the step 230.

The step 230 decides whether or not the lapse of time from the moment of the outputting of the anti-collision technique identification requirement signal Srw reaches a predetermined time interval "T" which covers the time intervals T1, T2, and T3 (see FIG. 6). When the lapse of time does not reach the predetermined time interval "T", the program returns from the step 230 to the step 210. When the lapse of time reaches the predetermined time interval "T", the program advances from the step 230 to a step 240.

The step 240 decides whether or not at least one flag set by the step 220 is present. In other words, the step 240 decides whether or not at least one anti-collision technique answer signal in an anti-collision technique is present. When at least one set flag is present, the program advances from the step 240 to a subroutine block 250. Otherwise, the program exits from the step 240, and then the current execution cycle of the program ends.

It is assumed that the anti-collision technique answer signals Sa, Sb, Sc, and Sd from the IC cards "A", "B", "C", and "D" have been inputted into the microcomputer 10, and all flags related to the anti-collision technique answer signals Sa, Sb, Sc, and Sd (all flags of the first, second, and third anti-collision techniques represented by the answer signals Sa, Sb, Sc, and Sd) have been set by the step 220.

The subroutine block 250 accesses the data in the memory 20, which represents the relation of the first anti-collision technique (the anti-collision technique used by the IC cards "A" and "B") with a requirement signal, in response to the set flags related to the anti-collision technique answer signals Sa and Sb. The subroutine block 250 generates a signal Scα of a requirement for the identification of the type of the related IC card or the types of the related IC cards (the types of the IC cards "A" and "B") in response to the accessed data. The subroutine block 250 outputs the card type identification requirement signal Scα to the modulation circuit 30. The card type identification requirement signal Scα has a card type identification requirement code word corresponding to the first anti-collision technique (the anti-collision technique used by the IC cards "A" and "B"). Then, the microcomputer 10 receives the card type identification answer signal Sca from the IC card "A". The subroutine block 250 generates a card type identification code word, which corresponds to the IC card "A", in response to the card type identification answer signal Sca. The subroutine block 250 writes data of the generated card type identification code word in the memory 20. The subroutine block 250 resets the flag related to the anti-collision technique answer signals Sa. Then, the microcomputer 10 receives the card type identification answer signal Scb from the IC card "B". The subroutine block 250 generates a card type identification code word, which corresponds to the IC card "B", in response to the card type identification answer signal Scb. The subroutine block 250 writes data of the generated card type identification code word in the memory 20. The subroutine block 250 resets the flag related to the anti-collision technique answer signals Sb. Then, the program advances from the subroutine block 250 to a step 260.

The step 260 decides whether or not at least one IC card to be identified remains by referring to, for example, the flags related to the anti-collision technique answer signals Sa, Sb, Sc, and Sd. When at least one IC card to be identified remains, the program returns from the step 260 to the subroutine block 250. Otherwise, the program exits from the step 260, and then the current execution cycle of the program ends.

The subroutine block 250 accesses the data in the memory 20, which represents the relation of the second anti-collision technique (the anti-collision technique used by the IC card "C") with a requirement signal, in response to the set flag related to the anti-collision technique answer signal Sc. The subroutine block 250 generates a signal Scβ of a requirement for the identification of the type of the related IC card (the IC card "C") in response to the accessed data. The subroutine block 250 outputs the card type identification requirement signal Scβ to the modulation circuit 30.

The card type identification requirement signal Scβ has a card type identification requirement code word corresponding to the second anti-collision technique (the anti-collision technique used by the IC card "C"). Then, the microcomputer 10 receives the card type identification answer signal Scc from the IC card "C". The subroutine block 250 generates a card type identification code word, which corresponds to the IC card "C", in response to the card type identification answer signal Scc. The subroutine block 250 writes data of the generated card type identification code word in the memory 20. The subroutine block 250 resets the flag related to the anti-collision technique answer signals Sc. Then, the program advances from the subroutine block 250 to the step 260.

The step 260 decides whether or not at least one IC card to be identified remains by referring to, for example, the flags related to the anti-collision technique answer signals Sa, Sb, Sc, and Sd. When at least one IC card to be identified remains, the program returns from the step 260 to the subroutine block 250. Otherwise, the program exits from the step 260, and then the current execution cycle of the program ends.

The subroutine block 250 accesses the data in the memory 20, which represents the relation of the third anti-collision technique (the anti-collision technique used by the IC card "D") with a requirement signal, in response to the set flag related to the anti-collision technique answer signal Sd. The subroutine block 250 generates a signal Scγ of a requirement for the identification of the type of the related IC card (the IC card "D") in response to the accessed data. The subroutine block 250 outputs the card type identification requirement signal Scγ to the modulation circuit 30. The card type identification requirement signal Scγ has a card type identification requirement code word corresponding to the third anti-collision technique (the anti-collision technique used by the IC card "D"). Then, the microcomputer 10 receives the card type identification answer signal Scd from the IC card "D". The subroutine block 250 generates a card type identification code word, which corresponds to the IC card "D", in response to the card type identification answer signal Scd. The subroutine block 250 writes data of the generated card type identification code word in the memory 20. The subroutine block 250 resets the flag related to the anti-collision technique answer signals Sd. After the subroutine block 250, the program advances to the step 260.

The step 260 decides whether or not at least one IC card to be identified remains by referring to, for example, the flags related to the anti-collision technique answer signals Sa, Sb, Sc, and Sd. When any IC card to be identified does not remain, the program exits from the step 260 and then the current execution cycle of the program ends.

Figure 5:
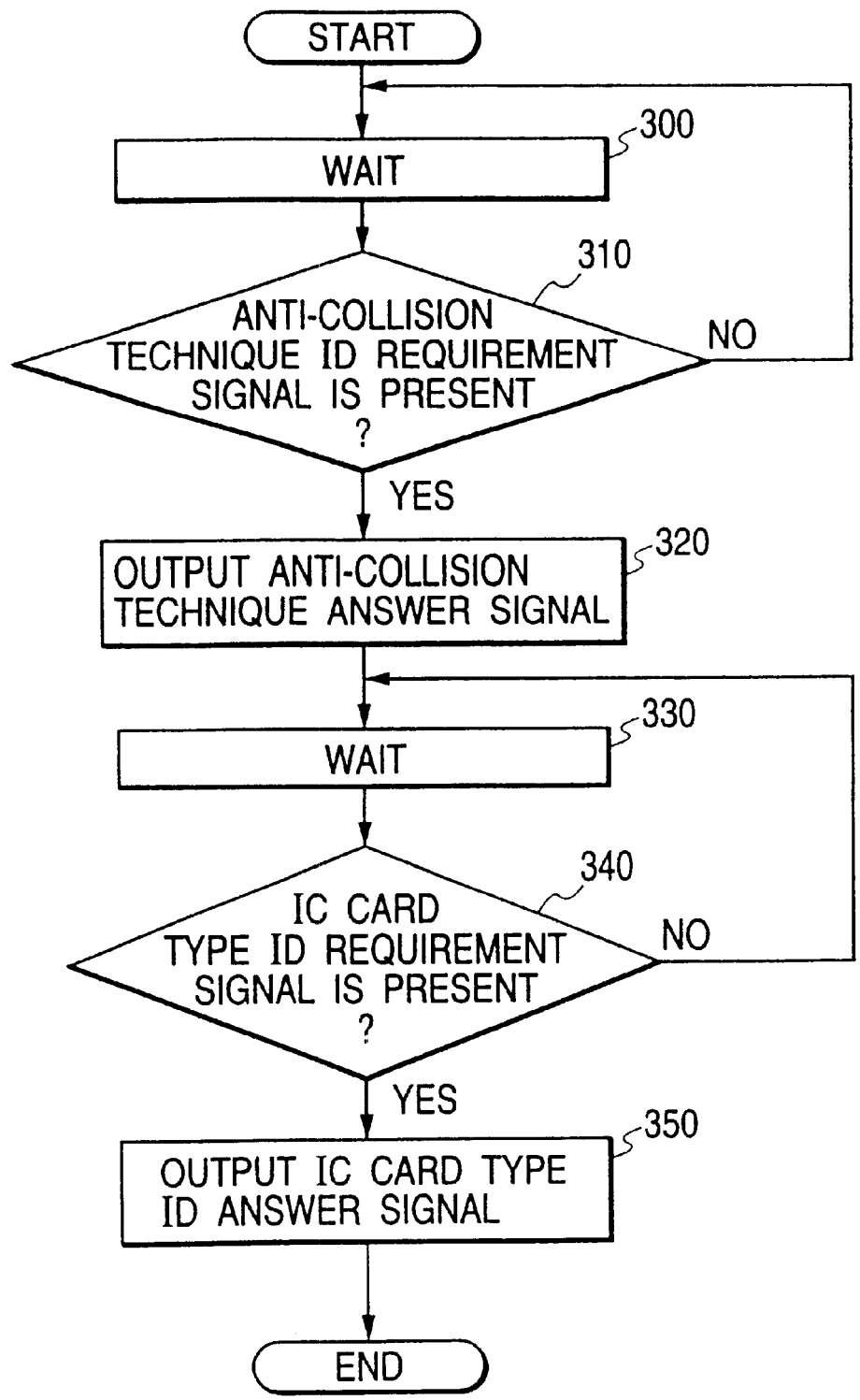
FIG. 5 is a flowchart of a program for a microcomputer in the IC card of FIG. 3.

As previously indicated, the microcomputer 100 in the IC card "A" operates in accordance with a program stored in its internal ROM. FIG. 5 is a flowchart of the program in the microcomputer 100.

As shown in FIG. 5, a first step 300 of the program waits a given short time interval. Then, the program advances from the step 300 to a step 310.

The step 310 decides whether or not an anti-collision technique identification requirement signal Srw is present. When an anti-collision technique identification requirement signal Srw is present, the program advances from the step 310 to a step 320. Otherwise, the program returns from the step 310 to the step 300.

The step 320 reads out the data from the memory 90, and generates an answer signal Sa from the readout data. The step 320 determines a desired output timing on the basis of the readout data. The desired output timing depends on the anti-collision technique used by the present IC card (the IC card "A"). The step 320 outputs the generated answer signal Sa to the modulation circuit 110 at a timing equal to the desired output timing. The answer signal Sa contains the information of the anti-collision technique used by the IC card "A" (that is, the first anti-collision technique). After the step 320, the program advances to a step 330.

The step 330 waits a given short time interval. Then, the program advances from the step 330 to a step 340.

The step 340 decides whether or not a card type identification requirement signal Scα is present. When a card type identification requirement signal Sca is present, the program advances from the step 340 to a step 350. Otherwise, the program returns from the step 340 to the step 330.

The step 350 reads out the data from the memory 90 in response to the card type identification requirement signal Scα, and generates an answer signal Sca from the readout data. The step 350 determines a desired output timing on the basis of the readout data. The desired output timing depends on the identification information of the present IC card (the IC card "A"). The step 350 outputs the generated answer signal Sca to the modulation circuit 110 at a timing equal to the desired output timing. The answer signal Sca contains the identification information of the type of the IC card "A" which is related to the anti-collision technique used by the related IC card "A" (that is, the first anti-collision technique). After the step 350, the current execution cycle of the program ends.

The telephone set on which the reader/writer RW is provided may be replaced by a dispenser or an automatic vending machine.

The microcomputers 10 and 100 may be replaced by exclusive control circuits composed of discrete analog circuits or discrete digital circuits.

At least part of the combination of the microcomputer 10, the memory 20, the modulation circuit 30, and the demodulation circuit 50 may be formed by a single IC chip.

At least part of the combination of the memory 90, the microcomputer 100, the power supply circuit 70, the modulation circuit 110, and the demodulation circuit 80 may be formed by a single IC chip.

What is claimed is:

1. A contactless IC card communication system comprising:
   a reader/writer (RW) and IC cards which communicate with each other on a contactless basis according to anti-collision techniques, the IC cards being of types which relate to the anti-collision techniques;
   first means provided in the reader/writer for implementing identification requirement with respect to given anti-collision techniques among the anti-collision techniques;
   second means provided in respective IC cards among the IC cards which use different anti-collision techniques respectively for implementing answers to the anti-collision technique identification requirement by the first means at different timings respectively;
   third means provided in the reader/writer for requiring identifications of types of the IC cards in dependence upon the given anti-collision techniques in response to the answers by the second means;

fourth means provided in respective IC cards among the IC cards which use different anti-collision techniques respectively for returning identification data of the related IC cards in response to the card type identification requirements by the third means; and fifth means provided in the reader/writer for identifying the types of the IC cards in response to the identification data returned by the fourth means.

2. A contactless IC card communication method in which a reader/writer (RW) and IC cards communicate with each other on a contactless basis according to anti-collision techniques, the IC cards being of types which relate to the anti-collision techniques, the method comprising:

causing the reader/writer to implement identification requirement with respect to given anti-collision techniques among the anti-collision techniques by the reader/writer;

implementing answers to the anti-collision technique identification requirement by the reader/writer at different timings respectively for respective IC cards among the IC cards which use different anti collision techniques respectively;

causing the reader/writer to require identifications of types of the IC cards in dependence upon the given anti-collision techniques in response to the answers for the respective IC cards;

returning identification data of the IC cards in response to the card type identification requirements by the reader/writer for respective IC cards among the IC cards which use different anti-collision techniques respectively; and causing the reader/writer to identify the types of the IC cards in response to the identification data of the respective IC. cards.

3. A contactless IC card communication system comprising:

a reader/writer;

a first IC card using a first anti-collision technique;

a second IC card using a second anti-collision technique different from the first anti-collision technique;

first means provided in the reader/writer for transmitting a first requirement signal to the first IC card and the second IC card;

second means provided in the first IC card for generating a first answer signal in response to the first requirement signal transmitted from the reader/writer, and for returning the first answer signal to the reader/writer at a first timing, the first answer signal representing the anti-collision technique used by the first IC card;

third means provided in the second IC card for generating a second answer signal in response to the first requirement signal transmitted from the reader/writer, and for returning the second answer signal to the reader/writer at a second timing different from the first timing, the second answer signal representing the anti-collision technique used by the second IC card;

fourth means provided in the reader/writer for generating a second requirement signal in response to the first answer signal transmitted from the first IC card, and for transmitting the second requirement signal to the first IC card at a third timing determined by the anti-collision technique represented by the first answer signal; and fifth means provided in the reader/writer for generating a third requirement signal in response to the second answer signal transmitted from the second IC card, and for transmitting the third requirement signal to the second IC card at a fourth timing different from the third timing and determined by the anti-collision technique represented by the second answer signal.

4. A contactless IC card communication system comprising:

a reader/writer;

a first IC card using a first anti-collision technique;

a second IC card using a second anti-collision technique different from the first anti-collision technique;

first means provided in the reader/writer for transmitting a first requirement signal to the first IC card and the second IC card;

second means provided in the first IC card for generating a first answer signal in response to the first requirement signal transmitted from the reader/writer, and for returning the first answer signal to the reader/writer at a first timing, the first answer signal representing the anti-collision technique used by the first IC card;

third means provided in the second IC card for generating a second answer signal in response to the first requirement signal transmitted from the reader/writer, and for returning the second answer signal to the reader/writer at a second timing different from the first timing, the second answer signal representing the anti-collision technique used by the second IC card;

fourth means provided in the reader/writer for generating a second requirement signal in response to the first answer signal transmitted from the first IC card, and for transmitting the second requirement signal to the first IC card at a third timing determined by the anti-collision technique represented by the first answer signal;

fifth means provided in the reader/writer for generating a third requirement signal in response to the second answer signal transmitted from the second IC card, and for transmitting the third requirement signal to the second IC card at a fourth timing different from the third timing and determined by the anti-collision technique represented by the second answer signal;

sixth means provided in the first IC and card for generating a third answer signal and returning the third answer signal to the reader/writer in response to the second requirement signal transmitted from the reader/writer, the third answer signal representing identification information of the first IC card;

seventh means provided in the second IC card for generating a fourth answer signal and returning the fourth answer signal to the reader/writer in response to the third requirement signal transmitted from the reader/writer, the fourth answer signal representing identification information of the second IC card;

eighth means provided in the reader/writer for recovering the identification information of the first IC card from the third answer signal transmitted therefrom, and for storing the recovered identification information of the first IC card; and ninth means provided in the reader/writer for recovering the identification information of the second IC card from the fourth answer signal transmitted therefrom, and for storing the recovered identification information of the second IC card.

5. A contactless IC card communication system comprising:

a reader/writer (RW) and IC cards which communicate with each other on a contactless basis according to anti-collision techniques;

first means provided in the reader/writer for implementing identification requirement with respect to given anti-collision techniques among the anti-collision techniques;

second means provided in respective IC cards among the IC cards which use different anti-collision techniques respectively for implementing answers to the anti-collision technique identification requirement by the first means at different timings respectively;

third means provided in the reader/writer for requiring identifications of the IC cards in dependence upon the given anti-collision techniques in response to the answers by the second means;

fourth means provided in respective IC cards among the IC cards which use different anti-collision techniques respectively for returning identification data of the related IC cards in response to the card identification requirements by the third means; and fifth means provided in the reader/writer for identifying the IC cards in response to the identification data returned by the fourth means.

6. A contactless IC card communication method in which a reader/writer (RW) and IC cards communicate with each other on a contactless basis according to anti-collision techniques, the method comprising:

causing the reader/writer to implement identification requirement with respect to given anti-collision techniques among the anti-collision techniques by the reader/writer;

implementing answers to the anti-collision technique identification requirement by the reader/writer at different timings respectively for respective IC cards among the IC cards which use different anti-collision techniques respectively;

causing the reader/writer to require identifications of the IC cards in dependence upon the given anti-collision techniques in response to the answers for the respective IC cards;

returning identification data of the IC cards in response to the card identification requirements by the reader/writer for respective IC cards among the IC cards which use different anti-collision techniques respectively; and causing the reader/writer to identify the IC cards in response to the identification data of the respective IC cards.

* * * * *